O. MEILI AND P. BLUMBERG.
STEERING GEAR CONTROL ATTACHMENT.
APPLICATION FILED MAY 16, 1921.
1,405,854.
Patented Feb. 7, 1922.
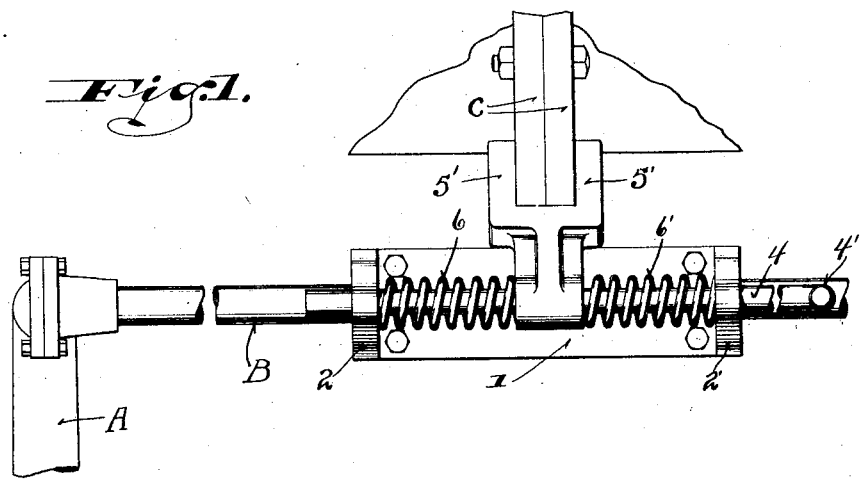
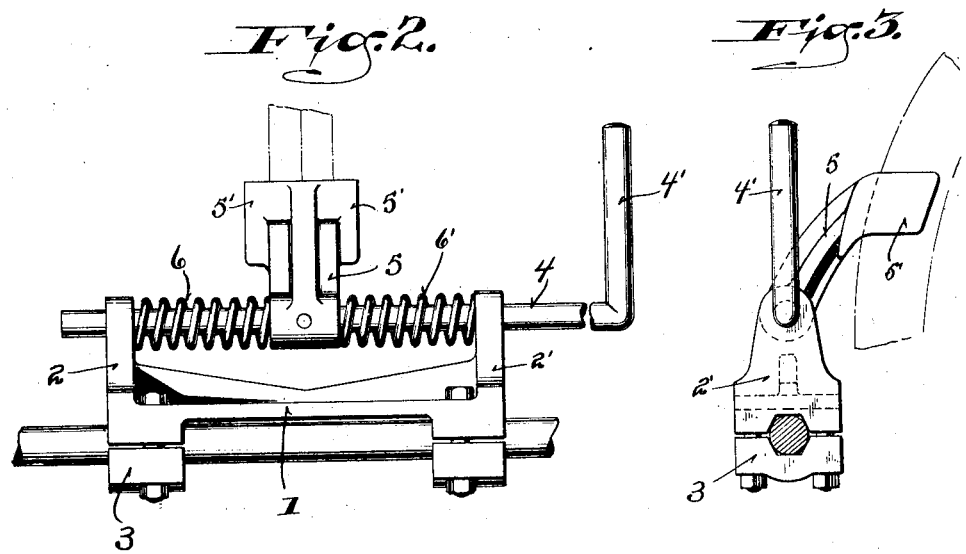
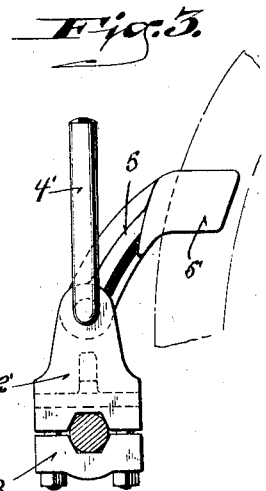
INVENTORS
Otto Meili
Paul Blumberg
BY
Young & Young
ATTORNEYS.

UNITED STATES PATENT OFFICE.

OTTO MEILI AND PAUL BLUMBERG, OF NEW HOLSTEIN, WISCONSIN, ASSIGNORS TO THE MEILI-BLUMBERG COMPANY, INC., OF NEW HOLSTEIN, WISCONSIN.

STEERING-GEAR-CONTROL ATTACHMENT.

1,405,854.  Specification of Letters Patent.  Patented Feb. 7, 1922.

Application filed May 16, 1921. Serial No. 469,768.

*To all whom it may concern:*

Be it known that we, OTTO MEILI and PAUL BLUMBERG, both citizens of the United States, and residents of New Holstein, in the county of Calumet and State of Wisconsin, have invented certain new and useful Improvements in Steering-Gear-Control Attachments, and we do hereby declare that the following is a full, clear, and exact description thereof.

Our invention refers to steering gear attachments for motor driven vehicles, and it has for its object to provide a simple, economical and effective device for attachment to the steering rod of such vehicles, whereby the rod may be selectively locked in yielding connection with the engine casing to normally exert tension upon the dirigible wheels, whereby they will be held in alignment with the tread of the vehicle.

With the above object in view, the invention consists in certain peculiarities of construction and combination of parts, as are hereinafter set forth with reference to the accompanying drawings and subsequently claimed.

In the drawings:

Figure 1 represents a plan view of fragments comprising standard parts of a tractor having attached thereto a steering gear controlling device embodying the features of our invention.

Figure 2 is a side view of the steering device, the same being shown attached to the standard steering rod of a tractor, and Figure 3 is an end view of the same illustrating the steering rod in section, and indicating in dotted lines, an offset portion of the engine casing, whereby the steering device is locked for functioning under spring control.

Referring by character to the drawings, A represents a steering joint or knuckle having attached thereto a standard steering rod B, which steering rod in practice extends rearwardly of the machine, and in juxtaposition to circular flanges C that form parts of the engine casing, it being understood that said flanges in this instance constitute offsets from the casing, which offsets are utilized in the application of our device to a tractor.

A bracket 1 having spaced apertured ears 2 2' is mounted upon the steering rod B by suitable clamping bolts and clips 3, the said bracket being positioned opposite the casing flanges or offset C. Rotatably and reciprocatively mounted in the apertured ears is a plunger rod 4 having an offset end which constitutes a controlling handle 4'. The plunger rod has secured thereto, midway between the ears of the bracket, a locking dog 5, which locking dog is, in this instance, formed with spaced jaws 5' that are arranged to straddle or engage the engine casing offsets C when it is desired to lock the device for functioning. Interposed between opposite sides of the locking dog and ears 2 2' are coil springs 6 6', which coil springs normally serve to center the locking dog. When it is desired to yieldingly lock the steering gear, the operator manipulates the plunger rod handle 4', whereby the jaws 5 5' of the locking dog will engage the offset flanges of the engine housing, and in this position, the dirigible wheels of the vehicle are normally in true alignment.

Hence, thereafter, when the steering wheel, not shown, is released or held loosely, the springs 6 6', serving as compensators will tend to draw the steering rod to its normal position, whereby the wheels are straightened, and thus the dirigible wheels are under spring influence to prevent wabble when travelling over rough ground, it being understood that this yielding prevention of wabble means, has been found essential in the operation of a tractor.

From the foregoing description, it will be seen that the device can be readily attached to any tractor without cutting or fitting of parts, or detached therefrom, and when it is not in use as a wheel centering device, it can be readily disconnected from its locking engagement to the engine housing or analogous parts, whereby the steering mechanism will float as under ordinary conditions.

We claim:

1. In a motor driven vehicle having an engine housing provided with an offset end, a longitudinally disposed steering rod adapted to travel past the offset; the combination of a steering gear controlling attachment, the same including a spaced ear bracket secured to the steering rod, a longitudinally disposed plunger rod slidably and rotatably mounted in the bracket ears, opposed springs associated with the plunger rod, and a dog carried by said plunger rod for engagement with the engine casing offset whereby the steering rod may be placed under the centering influence of the plunger rod spring.

2. In a motor driven vehicle having an engine housing provided with an offset end, a longitudinally disposed steering rod adapted to travel past the offset; the combination of a steering gear controlling attachment comprising a bracket associated with the steering rod, a spring centered oscillatory plunger rod carried by the bracket, and a dog secured to the plunger rod for selective engagement with the engine housing offset.

In testimony that we claim the foregoing we have hereunto set our hands at New Holstein, in the county of Calumet and State of Wisconsin.

OTTO MEILI.
PAUL BLUMBERG.